(12) United States Patent
Goi et al.

(10) Patent No.: US 6,254,504 B1
(45) Date of Patent: Jul. 3, 2001

(54) POWER TRANSMISSION APPARATUS FOR HELICOPTER

(75) Inventors: Tatsuhiko Goi; Kouji Kawakami; Eiichi Yamakawa, all of Kakamigahara (JP)

(73) Assignee: Advanced Technology Institute of Commuter-Helicopter, Ltd., Gifu (JP)

( * ) Notice: Subject to any disclaimer, the term of this patent is extended or adjusted under 35 U.S.C. 154(b) by 0 days.

(21) Appl. No.: 09/404,823

(22) Filed: Sep. 24, 1999

(30) Foreign Application Priority Data

Mar. 24, 1999 (JP) .................................................. 11-080445

(51) Int. Cl.$^7$ .................................................. F16H 37/02
(52) U.S. Cl. .................................................. 475/216
(58) Field of Search .................................. 475/216, 215, 475/217, 214, 208, 207

(56) References Cited

U.S. PATENT DOCUMENTS

| | | | |
|---|---|---|---|
| 2,086,491 | * 7/1937 | Dodge | 475/216 |
| 4,382,188 | * 5/1983 | Cronin | 475/216 X |
| 4,402,237 | 9/1983 | Tomlinson . | |
| 5,073,157 | * 12/1991 | Herscovici | 475/214 X |
| 5,074,830 | * 12/1991 | Perry | 475/216 |
| 5,782,433 | 7/1998 | Goi et al. . | |
| 5,803,858 | * 9/1998 | Haka | 475/214 X |
| 6,036,616 | * 3/2000 | McCarrick et al. | 475/214 |
| 6,045,477 | * 4/2000 | Schmidt | 475/216 X |
| 6,117,037 | * 9/2000 | Ymazaki | 475/216 |

FOREIGN PATENT DOCUMENTS

| | | |
|---|---|---|
| 0 507 329 | 10/1992 | (EP) . |
| 0 739 815 | 10/1996 | (EP) . |
| 0 753 456 | 1/1997 | (EP) . |
| 4-287799 | 10/1992 | (JP) . |
| 08198192 | 8/1996 | (JP) . |
| 8-296710 | 11/1996 | (JP) . |
| 10-264895 | 10/1998 | (JP) . |

* cited by examiner

*Primary Examiner*—Charles A Marmor
*Assistant Examiner*—Roger Pang
(74) *Attorney, Agent, or Firm*—Wenderoth, Lind & Ponack, L.L.P.

(57) ABSTRACT

In a variable mode of operation in which clutches are locked and a clutch and a brake are unlocked, the power of an input shaft is branched to a traction transmission mechanism. By contrast, in a fixed mode of operation in which the clutches are unlocked and the clutch and the brake are locked, the power of the input shaft is not branched to the traction transmission mechanism. In this way, the fixed mode and the variable mode are selectively used, whereby noise reduction and enhanced fuel efficiency can be attained. According to this configuration, it is possible to provide a power transmission apparatus for helicopters in which the number of rotations of a main rotor or a tail rotor is continuously varied while maintaining the number of rotations of an engine constant.

3 Claims, 8 Drawing Sheets

POWER TRANSMISSION APPARATUS FOR HELICOPTER

BACKGROUND OF THE INVENTION

1. Field of the Invention

The invention relates to a power transmission apparatus for helicopters whose speed change ratio can be continuously varied by a traction transmission mechanism.

2. Description of the Related Art

Recently, the demand for commuter helicopters capable of taking off and landing on a heliport in an urban district has been increased. Reduced noise level is a requirement for such a helicopter, and one of of effective measures to reduce the noise level is to reduce the rotational speed of the main rotor.

Japanese Unexamined Patent Publication JP-A 8-198192 (1996) of the same applicant as that of the present invention, discloses a power transmission apparatus comprising a traction transmission mechanism of continuously variable speed change ratio, coupled to an output shaft of an engine, for making the rotational speed of the power transmission apparatus variable. For the purpose of reducing noise of helicopters, the apparatus is designed to reduce only the rotational speed of the main rotor under the condition that the rotational speed of the tail rotor is maintained constant as well as the number of rotations of the engine.

The traction transmission mechanism includes input and output disks which are oppositely disposed so that their rotation shafts coincide with each other; a transmission roller which transmits the rotational power of the input disk to the output disk; and an actuator which changes tilt angle of the transmission roller. Lubricating oil is interposed between the disks and the roller, so that the power is transmitted by means of the shearing resistance of the lubricating oil. The transmission roller is disposed so as to be tilted by the actuator. By continuously displacing the actuator, the speed change ratio can be continuously varied.

In a conventional power transmission apparatus for helicopters, having no traction transmission mechanism, the number of rotations of the engine is reduced with a constant speed change ratio. Hence, the number of rotations of the main rotor is constant, which causes the problem of noise generation.

On the other hand, simple incorporation of such a traction transmission mechanism into a helicopter causes an increase of control gain during high-speed rotation, which is a cause of a generation of large tilting force. As a consequence the tilt angle is suddenly changed, and therefore a slide occurs between the disks and the rotor. When a slide occurs, power transmission ability is lost and the torque of the main rotor is rapidly lowered.

Among traction transmission mechanisms, for example, a toroidal CVT (Continuously Variable Transmission) has power transmission efficiency of only about 90%. Even when such a CVT is combined with a differential gear transmission, the power transmission efficiency of about 97% is obtained at the highest.

SUMMARY OF THE INVENTION

It is an object of the invention to provide a power transmission apparatus for helicopters, capable of continuously varying the rotational speed of a main or tail rotor under the condition that the number of rotations of an engine is maintained constant, ensuring safety even in the case where a slide of a traction transmission mechanism occurs, and achieving high power transmission efficiency when transmission is not required.

The invention provides a power transmission apparatus for helicopters, comprising a traction transmission mechanism, capable of continuously varying speed change ratio by the traction transmission mechanism. The apparatus comprises a coupling switching mechanism for changing over a coupling state among an input shaft, an output shaft, and the traction transmission mechanism to carry out switching of the operation mode between a variable mode (in which the speed change ratio is made variable by branching power from the input shaft into power to be transmitted to the traction transmission mechanism, and into power to be joined with power from the traction transmission mechanism to be transmitted to the output shaft) and a fixed mode (in which the speed change ratio is made fixed by directly transmitting the power from the input shaft to the output shaft).

According to the invention, in the variable mode, the rotational speed of the main or tail rotor can be continuously varied by the traction transmission mechanism under the condition that the number of rotations of the engine is maintained constant.

For example, in the case of a flight over an urban district, the helicopter is operated in the variable mode, so that the number of rotations of the main rotor can be lowered to suppress the generation of noise. On the other hand, the operation is shifted to the fixed mode in a suburb so that power transmission efficiency can be increased to enhance fuel efficiency. In this way, the variable mode in which branched power is transmitted to the traction transmission mechanism, and the fixed mode in which no power is transmitted to the traction transmission mechanism are selectively used. Thus, both noise reduction and enhanced fuel efficiency can be attained.

Furthermore, the shift of operation mode between the variable mode and the fixed mode prevents occurrence of slide between a disk and a roller and lowering of power transmission efficiency.

Figure 1:
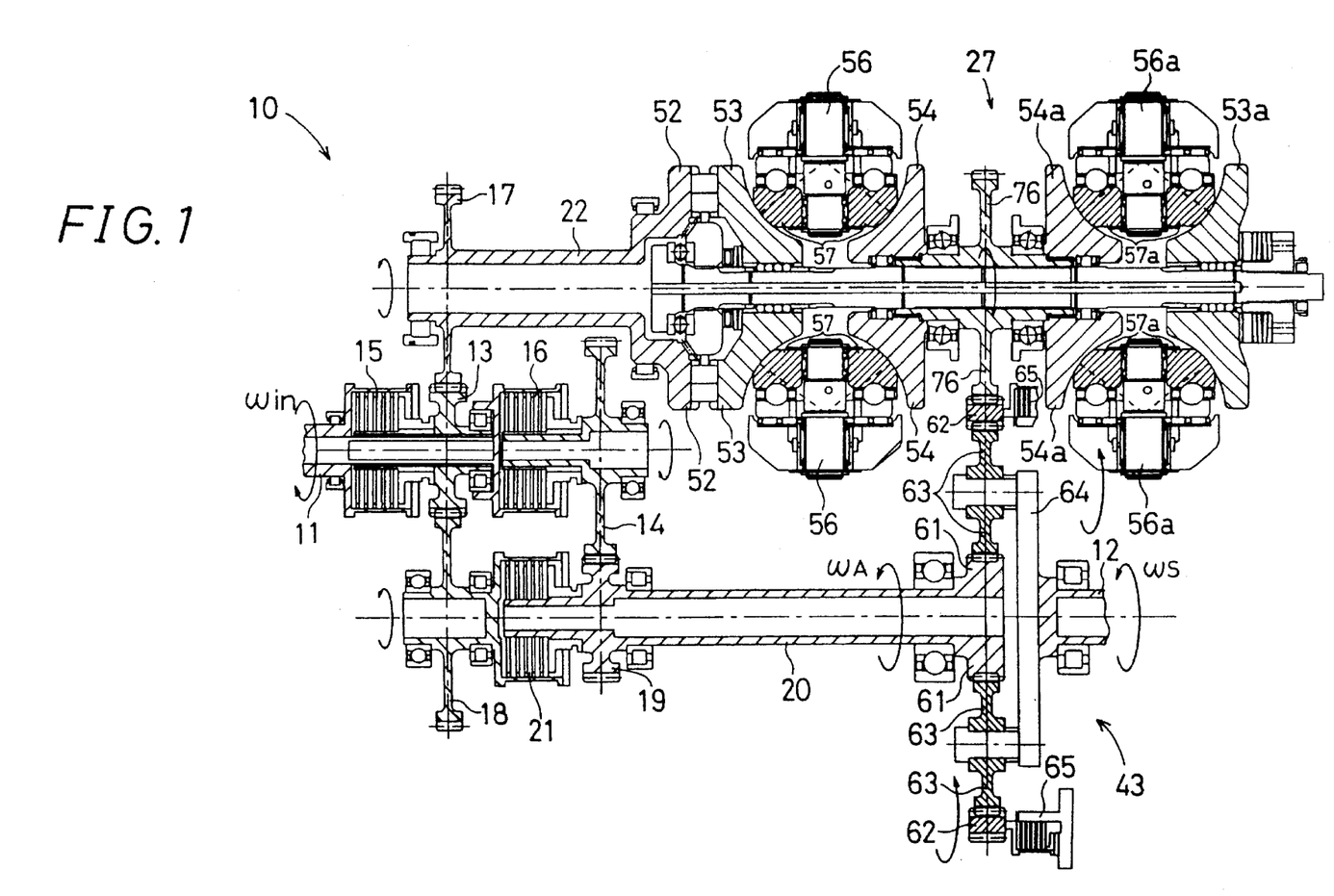
FIG. 1 is a view showing the mechanical structure of a speed change apparatus 10 to be incorporated into a power transmission apparatus of the invention.
Figure 4:
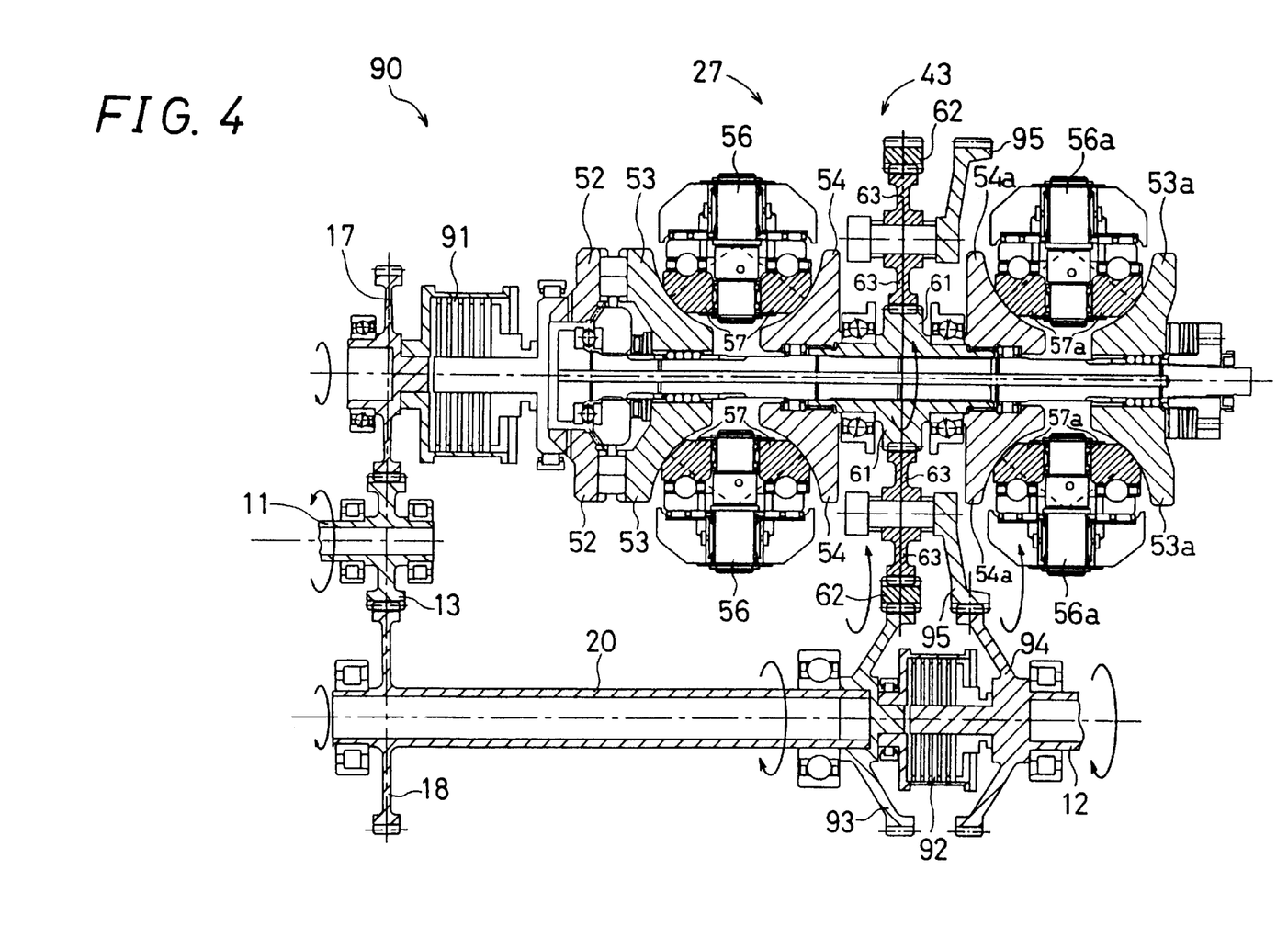
FIG. 4 is a view showing the mechanical structure of a speed change apparatus 90 to be incorporated into a power transmission apparatus of the invention.

For example, the coupling switching mechanism for the variable mode and the fixed mode in the invention can be realized as shown in FIG. 1 or 4. Furthermore, the invention provides a power transmission apparatus for helicopters, comprising a traction transmission mechanism and a planetary transmission mechanism. Power from an input shaft is branched into power which is transmitted to the traction transmission mechanism and power which is transmitted to the planetary transmission mechanism together with power from the traction transmission mechanism. The power from the planetary transmission mechanism is transmitted to an output shaft. The traction transmission mechanism includes an input disk, an output disk, and a transmission roller which is tiltably interposed between the input and output disks.

The planetary transmission mechanism includes a sun gear fixed to the output disk, planetary gears which meshes with the sun gear, and a ring gear having internal teeth that mesh with the planetary gears, and the ring gear transmits transmitting the power from the input shaft.

According to the invention, the combination of the traction transmission mechanism and the planetary transmission mechanism enables the rotational speed of the main rotor or the tail rotor to be continuously varied under the condition that the number of rotations of the engine is maintained constant. Therefore, noise reduction and enhanced power transmission efficiency can be attained. Since the sun gear of the planetary transmission mechanism is fixed to the output disk of the traction transmission mechanism, the power of the traction transmission mechanism can be directly transmitted to the planetary transmission mechanism. Consequently, an additional mechanism for coupling the mechanisms together is not required, and hence the apparatus can be miniaturized.

Figure 8:
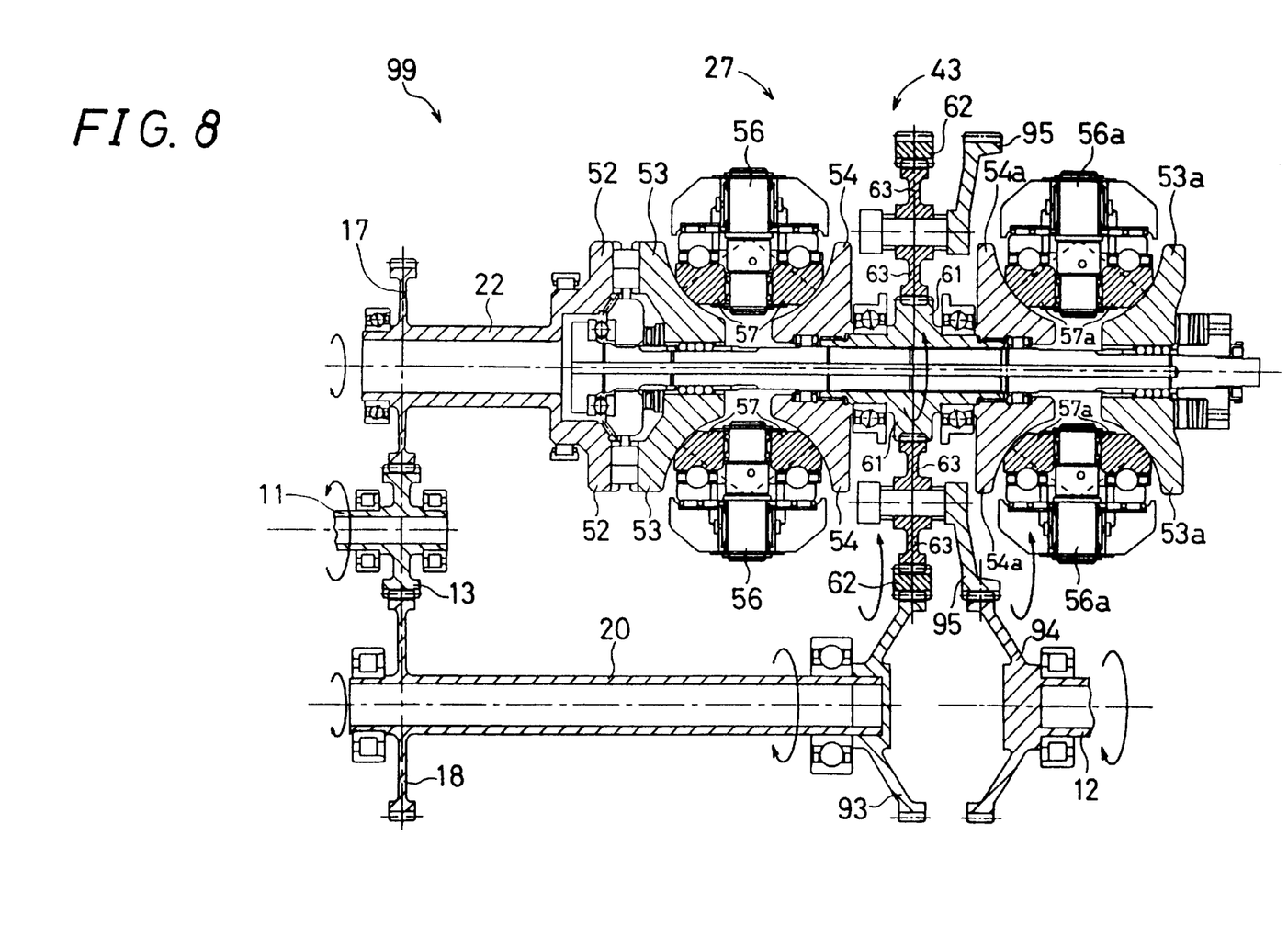
FIG. 8 is a view showing an example of modification in part of the speed change apparatus 90 of FIG. 4.

The structure of the invention in which the sun gear is fixed to the output disk can be realized by either a speed change apparatus 10 shown in FIG. 4, having a coupling switching mechanism, or a speed change apparatus 90 shown in FIG. 8, having no coupling switching mechanism.

Furthermore, in the invention it is preferable that the apparatus further comprises slide detecting means for detecting a slide in the traction transmission mechanism, and switching controlling means for, when a slide is detected, switching the coupling switching mechanism from the variable mode to the fixed mode.

According to the invention, a helicopter usually flies in the variable mode in which the branched power is transmitted to the traction transmission mechanism to reduce noise. When a slide in the traction transmission mechanism is detected, the mode is switched to the fixed mode in which the power from the input shaft is not branched to the traction transmission mechanism, so as to surely prevent occurrence of slide.

Furthermore, in the invention it is preferable that the apparatus further comprises a number of rotations detecting means for detecting number of rotations of the engine, and a switching controlling means for, during a period when the detected number of rotations is smaller than a predetermined number of rotations, setting the coupling switching mechanism to the fixed mode, and for, when the detected number of rotations is not smaller than the predetermined number of rotations, switching the coupling switching mechanism to the variable mode.

According to the invention, at the time of starting the engine of the helicopter and the like, the power is not branched to the traction transmission mechanism until the number of rotations of the engine reaches the predetermined number of rotations which is sufficiently large. Therefore, it is possible to prevent the transmission roller from being excessively tilted, and damage which may be applied to the traction transmission mechanism can be reduced. When the apparatus is operated in the fixed mode, it is possible to ensure high transmission efficiency. Therefore, the number of rotations can be rapidly raised, so that the helicopter can be promptly shifted to a take-off attitude. After the number of rotations of the engine reaches the predetermined number of rotations which is sufficiently large, the apparatus is operated in the variable mode so as to branch the power to the traction transmission mechanism, to make the speed change ratio variable.

Furthermore, in the invention it is preferable that the apparatus further comprises a number of rotations detecting means for detecting a number of rotations of the output shaft a speed change ratio controlling means for controlling speed change ratio of the traction transmission mechanism to bring the number of rotations of the output shaft in the variable mode close to the number of rotations in the fixed mode, and a switching controlling means for, when the number of rotations in the variable mode reaches the number of rotations in the fixed mode, switching the coupling switching mechanism from the variable mode to the fixed mode.

According to the invention, when the variable mode is to be switched to the fixed mode, the speed change ratio of the traction transmission mechanism is first controlled so as to bring the number of rotations of the output shaft in the variable mode close to the number of rotations in the fixed mode. When the number of rotations reaches the number of rotations in the fixed mode, the coupling switching mechanism is switched to the fixed mode. According to this configuration, switching from the variable mode to the fixed mode can be smoothly carried out without abruptly changing the speed change ratio during the switching operation. Therefore, damage to the transmission mechanism can be mitigated.

The invention provides a power transmission apparatus for helicopters, in which power of an engine is transmitted to a main rotor, comprising a traction transmission mechanism, and a coupling switching mechanism.

The coupling switching mechanism is provided for changing over a coupling state among the engine, the main rotor and the traction transmission mechanism to carry out switching of operation mode between a variable mode (in which the speed change ratio is made variable by branching power from the engine into power to be transmitted to the traction transmission mechanism and into power to be joined with power from the traction transmission mechanism to be transmitted to the main rotor) and a fixed mode (in which the speed change ratio is fixed by directly transmitting the power from the engine to the main rotor).

According to the invention, the interposition of the transmission mechanism between the engine and the main rotor enables the number of rotations of the main rotor to be continuously varied. Therefore, noise reduction and enhanced fuel efficiency can be attained. Moreover, it is possible to prevent occurrence of slide and lowering of power transmission efficiency of the power to the main rotor. Therefore, it is possible to prevent lowering of lift due to the rotation of main rotor blades, so that the flight can be safely continued.

The invention provides a power transmission apparatus for helicopters, in which power of an engine is transmitted to a main rotor and power of the main rotor is transmitted to a tail rotor, comprising a traction transmission mechanism, and a coupling switching mechanism.

The coupling switching mechanism is provided for changing over a coupling state among the main rotor, the tail rotor and the traction transmission mechanism to carry out switching of operation mode between a variable mode (in which the speed change ratio is made variable by branching power from the main rotor into power to be transmitted to the traction transmission mechanism and into power to be joined with power from the traction transmission mechanism to be transmitted to the tail rotor) and a fixed mode in which the speed change ratio is fixed by directly transmitting the power from the main rotor to the tail rotor.

According to the invention, the interposition of the transmission mechanism between the main rotor and the tail rotor enables the number of rotations of the tail rotor to be continuously varied. Moreover, it is possible to prevent occurrence of slide and lowering of power transmission efficiency of the power to the tail rotor. Therefore, it is possible to prevent reduction of thrust of the tail rotor, so that the flight can be safely continued without disturbing the flight attitude of the helicopter.

The invention provides a power transmission apparatus for helicopters, in which power of an engine is branched to transmit to a main rotor and a tail rotor, comprising a traction transmission mechanism, and a coupling switching mechanism.

The coupling switching mechanism is provided for changing over a coupling state among the main rotor, a branch shaft on a side of the main rotor and the traction transmission mechanism to carry out switching of operation mode between a variable mode (in which the speed change ratio is made variable by further branching power from the branch shaft on the side of the main rotor into power to be transmitted to the traction transmission mechanism and into power to be joined with power from the traction transmission mechanism to be transmitted to the main rotor) and a fixed mode in which the speed change ratio is fixed by directly transmitting the power from the branch shaft on the side of the main rotor to the main rotor.

According to the invention, the interposition of the transmission mechanism between the branching position of the engine power and the main rotor enables the number of rotations of the main rotor to be continuously varied. Therefore, noise reduction and enhanced fuel efficiency can be attained. Moreover, it is possible to prevent occurrence of slide and lowering of the power transmission efficiency of the power to the main rotor. Therefore, it is possible to prevent lowering of lift due to the rotation of main rotor blades, so that the flight can be safely continued.

The invention provides a power transmission apparatus for helicopters, in which power of an engine is branched to transmit to a main rotor and a tail rotor, comprising a traction transmission mechanism, and a coupling switching mechanism.

The coupling switching mechanism for changing over a coupling state among the tail rotor, a branch shaft on a side of the tail rotor and the traction transmission mechanism to carry out switching of operation mode between a variable mode (in which the speed change ratio is made variable by further branching power from the branch shaft on the side of the tail rotor into power to be transmitted to the traction transmission mechanism and into power to be joined with power from the traction transmission mechanism to be transmitted to the tail rotor) and a fixed mode in which the speed change ratio is fixed by directly transmitting the power from the branch shaft on the side of the tail rotor to the tail rotor.

According to the invention, the interposition of the transmission mechanism between the branching position of the engine power and the tail rotor enables the number of rotations of the tail rotor to be continuously varied. Moreover, it is possible to prevent occurrence of slide and lowering of power transmission efficiency of the power to the tail rotor. Therefore, it is possible to prevent reduction of thrust of the tail rotor, so that the flight can be safely continued without disturbing the flight attitude of the helicopter.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

FIG. 1 is a view showing the mechanical structure of a speed change apparatus 10 to be incorporated into a power transmission apparatus of the invention. The speed change apparatus 10 includes a traction transmission mechanism 27 and a planetary transmission mechanism 43 which are disposed between an input shaft 11 and an output shaft 12.

Gears 13 and 14 are axially arranged on one end of the input shaft 11 so as to be rotatable with respect to the input shaft 11. The gear 13 can be fixed to the input shaft 11 by means of a clutch 15. When the clutch 15 is locked, the gear 13 is rotated integrally with the input shaft 11, and when the clutch 15 is unlocked, the gear 13 becomes rotatable with respect to the input shaft 11. Also for the gear 14, a clutch 16 is disposed so that the gear can be rotated integrally with the input shaft 11 or irrespective of the input shaft 11. The gear 13 on the input shaft 11 meshes with a gear 17 of the traction transmission mechanism 27 and also with a gear 18 of the planetary transmission mechanism 43. The gear 14 on the input shaft 11 meshes only with a gear 19 of the planetary transmission mechanism.

The gears 18 and 19 are axially arranged on one end of a transmission shaft 20 of the planetary transmission mechanism 43 so as to be rotatable with respect to the transmission shaft 20. Among the gears, the gear 18 is disposed together with a clutch 21 so that, when the clutch 21 is locked, the gear is fixed to the transmission shaft 20 to be rotated integrally therewith, and when the clutch 21 is unlocked, the gear becomes rotatable with respect to the transmission shaft 20. The gear 19 is fixed to the transmission shaft 20 to be rotated integrally therewith.

The clutches 15, 16, and 21 constitute the coupling switching mechanism in the invention and can control power transmission from the input shaft 11 to the traction transmission mechanism 27, and from the input shaft 11 to the planetary transmission mechanism 43. Each of the clutches is configured by a usual wet multiple-disk clutch which is hydraulically operated. When the clutch disks slide over one another, it is possible to realize a semi-clutch condition which is an intermediate condition between a locked state and an unlocked state. Therefore, transfer from the locked state to the unlocked state or vice versa can be smoothly carried out.

The traction transmission mechanism 27 is a semi-toroidal CVT of the double cavity type. The gear 17 is fixed to one end of a transmission shaft 22 so as to transmit torque to a pressurizing apparatus 52 disposed on the other end of the transmission shaft 22. The pressurizing apparatus 52 transmits the torque to an input disk 53 while pressing the input disk 53 in the axial direction. Toroidal surface-like contact faces are formed on the insides of input and output disks 53 and 54, respectively, so as to be opposed to each other. A transmission roller 57 contacts the contact faces of the input and output disks 53 and 54, thereby realizing a traction drive. The transmission roller 57 is pivotally supported by a trunnion 56 so as to be tiltable along the contact faces. The trunnion 56 is displaceable in the direction of the tilt axis (the direction perpendicular to the sheet) of the transmission roller 57. The tilt angle of the transmission roller 57 can be controlled by adjusting the displacement amount of the trunnion.

In the traction transmission mechanism, therefore, the speed change ratio can be continuously adjusted by controlling the tilt angle of the transmission roller 57.

An input disk 53a, a trunnion 56a, a transmission roller 57a, and an output disk 54a are disposed so as to be symmetrical about a gear 76 with the input disk 53, the trunnion 56, the transmission roller 57, and the output disk 54, respectively. In the double cavity type in which the two transmission rollers 57 and 57a are coupled in parallel as described above, the transmission rollers have a relatively large contact area and hence are advantageous in durability and life. Moreover, the efficiency is enhanced because the shaft force is completed within the mechanism.

The output disks 54 and 54a are fixed to the gear 76, and torque of the disks is transmitted to a ring gear 62 of the planetary transmission mechanism 43 which meshes with the gear 76.

In the planetary transmission mechanism 43, a sun gear 61 is fixed to the other end of the transmission shaft 20 so as to be rotated integrally with the transmission shaft 20. Torque of the sun gear 61 is transmitted to a planetary gear 63 which meshes with the outer periphery of the sun gear. The planetary gear 63 meshes with internal teeth of the ring gear 62. Since the torque from the traction transmission mechanism 27 is transmitted to the ring gear 62, the power of the sun gear 61 and ring gear 62 is transmitted to the planetary gear 63. The number of revolutions of the planetary gear 63 is determined in accordance with the number of rotations of the sun gear 61 and ring gear 62. The revolution of the planetary gear 63 is taken out by means of a carrier 64 and then outputted through the output shaft 12.

In this way, the ring gear 62 is driven by the traction transmission mechanism 27 having a continuously variable speed change ratio, whereby the speed change ratio of the planetary transmission mechanism 43 can be arbitrarily controlled.

In order to control the operation of the ring gear 62, the planetary transmission mechanism 43 is provided with a brake 65. In the same manner as the clutches described above, the brake 65 is configured by a wet multiple-disk clutch. When no power is transmitted from the traction transmission mechanism 27, the brake is locked. According to this configuration, when no power is transmitted from the traction transmission mechanism 27, idling of the ring gear 62 due to the reaction force of power of the sun gear 61 can be prevented, so that only the power of the sun gear 61 is transmitted to the planetary gear 63.

Power transmitted from the input shaft 11 to the planetary transmission mechanism 43 is transmitted via a route passing through the gears 13 and 18 or passing through the gears 14 and 19. In the two cases, the speed change ratios are different from each other.

Hereinafter, this difference in speed change ratio will be described. First, it is assumed that the ratio of the number of teeth $Z_C$ of the ring gear 62 to the number of teeth $Z_A$ of the sun gear 61 is represented as $i_0$, rotational angular velocity of the sun gear 61 is represented as $\omega_{Af}$, and rotational angular velocity of the output shaft 12 is represented as $\omega_{Sf}$. Rotational angular velocity $\omega_C$ of the ring gear 62 is indicated by:

$$\omega_c = \frac{(1+i_0)\omega_s - \omega_A}{i_0} \qquad (1)$$

When the brake 65 is locked, the rotational angular velocity $\omega_C=0$. When the rotational angular velocity of the sun gear 61 is represented as $\omega_{Af}$ and the rotational angular velocity of the output shaft 12 is represented as $\omega_{Sf}$, therefore, the following is obtained from the above expression:

$$\omega_{Af}=(1+i_0)\omega_{Sf}$$

Assuming that rotational angular velocity of the input shaft 11 is represented as $\omega_{in}$, a speed change ratio in the case where the power is transmitted through the gears 13 and 18 is represented as $r_1$, and a speed change ratio in the case where the power is transmitted through the gears 14 and 19 is represented as $r_2$, the following equations are obtained:

$$\omega_A = \omega_{in}/r_1 \qquad (2)$$
$$r_2 = \frac{\omega_A}{\omega_{Af}} = \frac{\omega_{in}}{r_1\omega_{Sf}(1+i_0)}$$

As described above, the speed change ratios $r_1$ and $r_2$ are different from each other.

Figure 2:
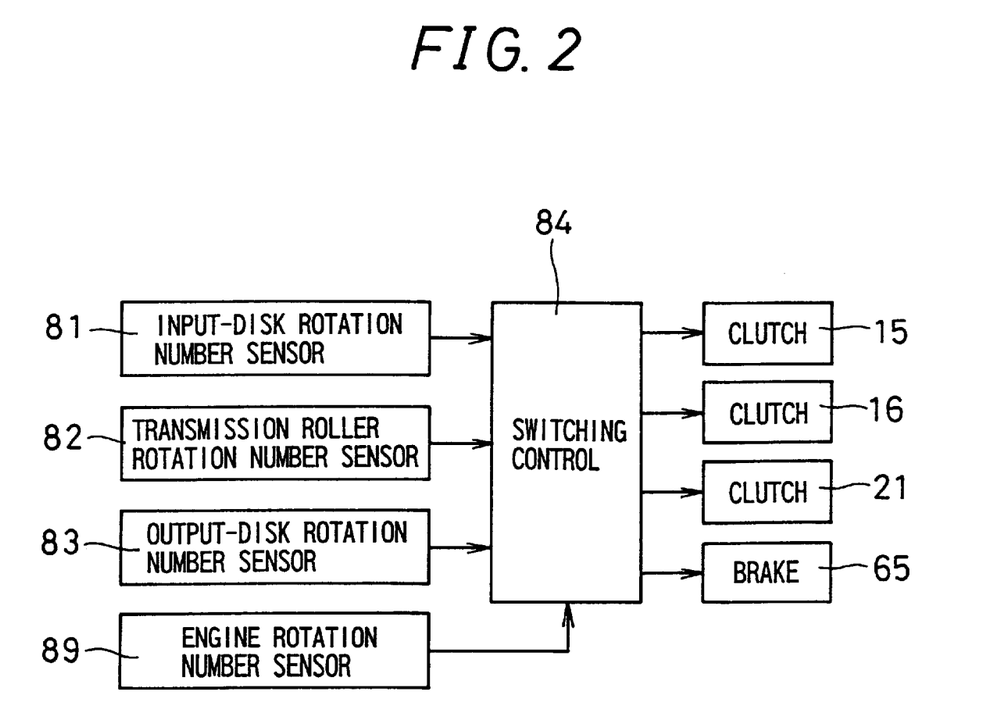
FIG. 2 is a block diagram showing the electrical configuration of the speed change apparatus 10 for performing clutch switching control.

FIG. 2 is a block diagram showing the electrical configuration of the speed change apparatus 10 for performing clutch switching control. In the traction transmission mechanism 27 of FIG. 1, disposed are an input-disk rotation number sensor 81 which measures the number of rotations of the input disks 53 and 53a, a transmission roller rotation number sensor 82 which measures the number of rotations of the transmission rollers 57 and 57a, an output-disk rotation number sensor 83 which measures the number of rotations of the output disks 54 and 54a, and an engine rotation number sensor 89 which measures the number of rotations of an output shaft of the engine. A switching control section 84 switches over the locked and unlocked states of the clutches 15, 16, 21 and the brake 65, on the basis of measurement values of the input-disk rotation number sensor 81, the transmission roller rotation number sensor 82, the output-disk rotation number sensor 83, and the engine rotation number sensor 89.

A coupling state in which the clutches 15 and 21 are locked and the clutch 16 and the brake 65 are unlocked is called variable mode, and an opposite coupling state in which the clutches 15 and 21 are unlocked and the clutch 16 and the brake 65 are locked is called fixed mode. In the variable mode, power from the input shaft 11 is branched to the traction transmission mechanism 27, and the speed change ratio is variable. In the fixed mode, the power is not branched to the traction transmission mechanism 27, and hence the speed change ratio is fixed.

The switching control section 84 calculates specific sliding on the basis of the measurement values of the input-disk rotation number sensor 81, the transmission roller rotation number sensor 82, and the output-disk rotation number sensor 83, and judges whether slide is occurring in the traction transmission mechanism 27 or not. In the case where the judgment result shows that slide is occurring, the coupling switching mechanism is switched to the fixed mode, and in the case of no occurrence of slide, the mechanism is switched to the variable mode. As a result, continuation of sliding for a significant period in the speed change apparatus 10 can be surely prevented.

Alternatively, the following control may be performed using the engine rotation number sensor 89. If the measurement value of the engine rotation number sensor 89 is smaller than a predetermined threshold value, the coupling switching mechanism is switched to the fixed mode. If, however the measurement value is not smaller than the predetermined threshold value, the mechanism is switched to the variable mode. As a result, the number of rotations can be promptly raised at the starting time of the engine and the like.

Figure 3:
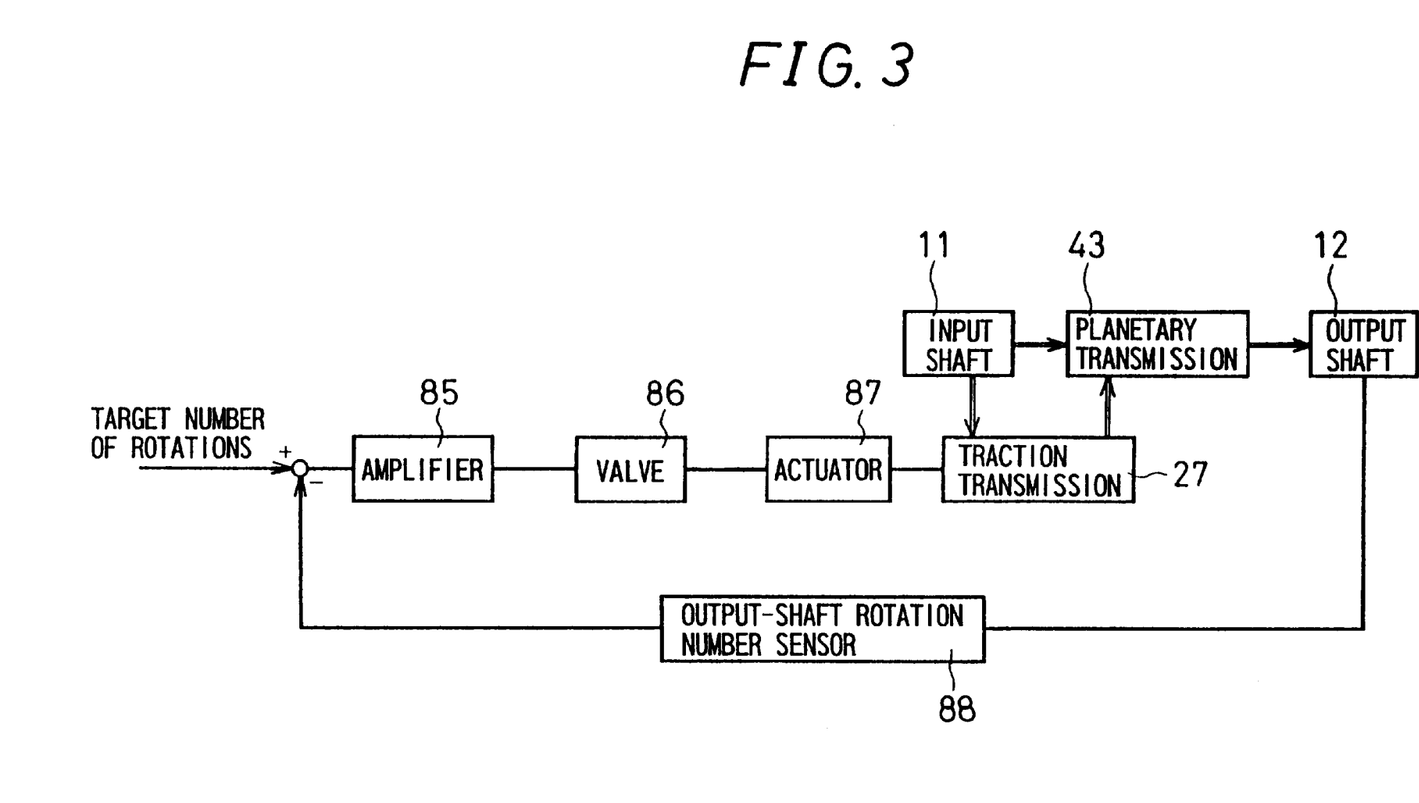
FIG. 3 is a block diagram showing the electrical configuration of the speed change apparatus 10 for performing output control.

FIG. 3 is a block diagram showing the electrical configuration of the speed change apparatus 10 for performing output control. The speed change apparatus 10 further includes an amplifier 85, a valve 86, a hydraulic actuator 87, and an output-shaft rotation number sensor 88. A signal of a target number of rotations which is suitably preset is subtracted from an output signal of the output-shaft shaft rotation number sensor 88. The amplifier 85 amplifies a result of the subtraction. The valve 86 is opened or closed in accordance with a signal from the amplifier 85, and the actuator 87 is displaced in accordance with the degree of opening of the valve 86 so as to tilt the transmission rollers 57 and 57a of the traction transmission mechanism 27. The output-shaft rotation number sensor 88 measures the number of rotations of the output shaft 12. According to this configuration, the number of rotations of the output shaft 12 can be stably maintained.

Alternatively, the controls of FIGS. 2 and 3 may be combined, so that the following control is performed in switching from the variable mode to the fixed mode. In the variable mode, the amplifier 85 controls the actuator 87 so as to bring the number of rotations of the output shaft 12 close to the number of rotations in the fixed mode. At the timing when the speed change ratio is changed and the number of rotations of the output shaft 12 reaches the number of rotations in the fixed mode, the switching control section 84 of FIG. 2 performs a control of switching from the variable mode to the fixed mode. According to this configuration, transfer from the variable mode to the fixed mode can be smoothly performed.

FIG. 4 is a view showing the mechanical structure of a speed change apparatus 90 to be incorporated into a power transmission apparatus of the invention. In the same manner as the speed change apparatus 10, the speed change apparatus 90 includes the traction transmission mechanism 27 and the planetary transmission mechanism 43, which are disposed between the input shaft 11 and the output shaft 12. A mechanism which couples the mechanisms together is differently configured. The description of the same components as those of the speed change apparatus 10 is omitted.

The gear 13 is fixed to one end of the input shaft 11 so as to be rotatable integrally with the input shaft 11. The gear 13 meshes with the gear 17 of the traction transmission mechanism 27 and also with the gear 18 of the planetary transmission mechanism 43. The gear 17 is coupled to the pressurizing apparatus 52 via a clutch 91. The gear 18 is fixed to one end of the transmission shaft 20 so as to be rotatable integrally with the transmission shaft 20. A gear 93 is fixed to the other end of the transmission shaft 20 so as to be rotatable integrally with the transmission shaft 20. A gear 94 is opposed to the gear 93 and fixed to the output shaft 12 so as to be rotatable integrally with the output shaft 12. A clutch 92 is interposed between the gears 93 and 94.

The clutches 91 and 92 constitute the coupling switching mechanism in the invention and can control power transmission from the input shaft 11 to the traction transmission mechanism 27, and power transmission from the input shaft 11 to the output shaft 12.

Only when the clutch 91 is locked, the power of the gear 17 is transmitted to the pressurizing apparatus 52 of the traction transmission mechanism 27. Unlike the speed change apparatus 10, the output disks 54 and 54a are fixed to the sun gear 61 of the planetary transmission mechanism 43. In this way, part of the traction transmission mechanism 27 also function as part of the planetary transmission mechanism 43. Therefore, the structure can be simplified, and the apparatus can be miniaturized.

Unlike the speed change apparatus 10, the ring gear 62 of the planetary transmission mechanism 43 meshes with the gear 93. As a result, the ring gear 62 is coupled to the input shaft 11 via the gear 93, the transmission shaft 20, and the gears 18 and 13, to transmit the power from the input shaft 11 to the planetary gear 63. A gear 95 is disposed in order to take out the revolution of the planetary gear 63. The gear 95 meshes with the gear 94 to transmit the power to the output shaft 12.

In this way, the sun gear 61 is driven by the traction transmission mechanism 27 in which the speed change ratio is continuously variable, whereby the speed change ratio of the planetary transmission mechanism 43 can be arbitrarily controlled.

In the speed change apparatus 90, the switching of the coupling switching mechanism, and the number of rotations of the output shaft 12 can be controlled by the same electrical configuration as those of FIGS. 2 and 3. In the switching control, the state in which the clutch 91 is locked and the clutch 92 is unlocked is called the variable mode, and the state in which the clutch 91 is unlocked and the clutch 92 is locked is called the fixed mode. In the variable mode, the input shaft 11 is coupled to the output shaft 12 via the traction transmission mechanism 27, and hence the speed change ratio is continuously variable. In the fixed mode, the input shaft 11 is directly coupled to the output shaft 12, or the shafts are not coupled to each other via the traction transmission mechanism 27, and hence the speed change ratio is fixed.

Figure 5:
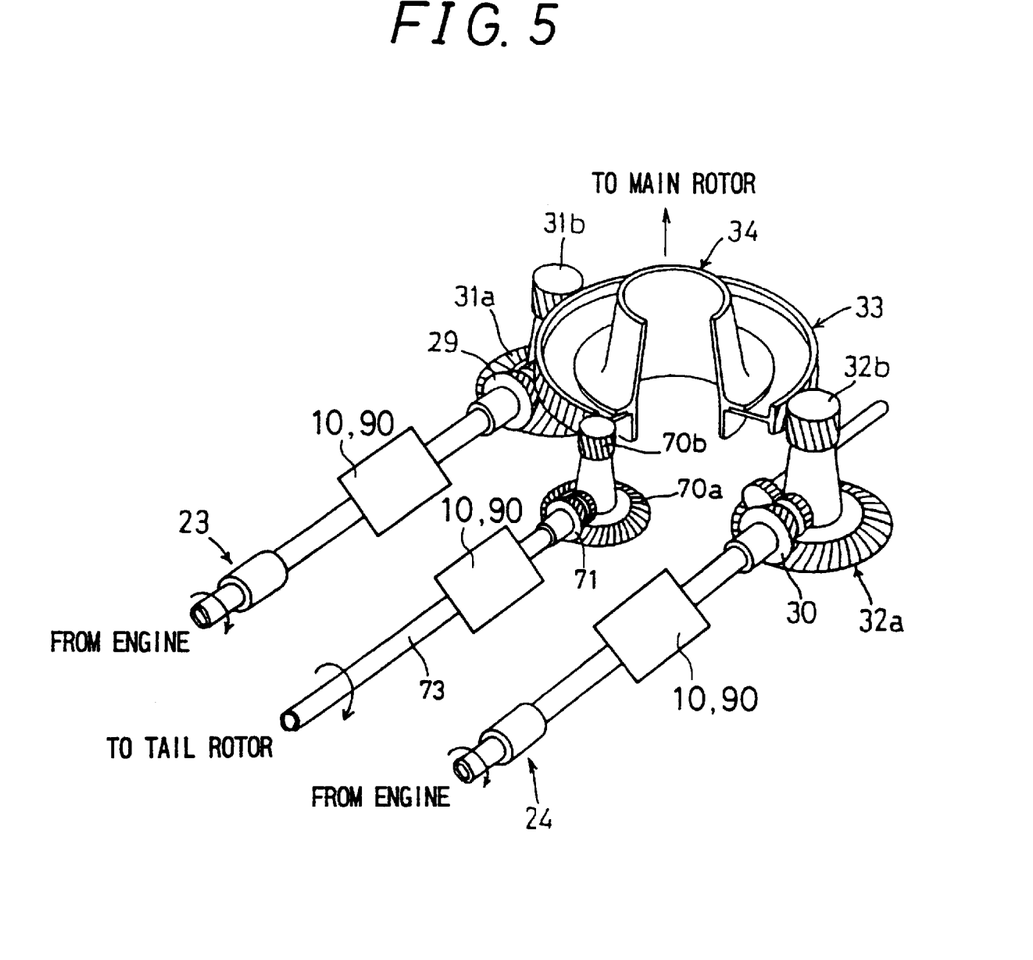
FIG. 5 is a view showing a first embodiment of a power transmission apparatus for helicopters into which a speed change apparatus is incorporated.

FIG. 5 is a view showing a first embodiment of a power transmission apparatus for helicopters into which a speed change apparatus is incorporated. Output shafts of a pair of engines are coupled to bevel gears 29 and 30 via freewheel clutches 23 and 24 which can transmit torque in one direction, respectively. The bevel gears 29 and 30 mesh with bevel gears 31a and 32a so as to change the directions of the respective rotation axes. A gear 31b which is rotated integrally with the bevel gear 31a, and a gear 32b which is rotated integrally with the bevel gear 32a mesh with a collector gear 33 to rotate a main rotor shaft 34.

In the power transmission system for a tail rotor, a gear 70b meshes with the collector gear 33, so that torque for the tail rotor branches. A bevel gear 70a which is rotated integrally with the gear 70b meshes with a bevel gear 71 so as to change a direction of a rotation axis. The bevel gear 71 is coupled to the tail rotor.

In the configuration of FIG. 5, a speed change apparatus is interposed between the freewheel clutch 23 and the bevel gear 29, the freewheel clutch 23 is coupled to the input shaft 11, and the output shaft 12 is coupled to the bevel gear 29. Similarly, another speed change apparatus is interposed between the freewheel clutch 24 and the bevel gear 30. According to this configuration, the number of rotations of the main rotor coupled to the main rotor shaft 34 can be adjusted under the condition that the number of rotations of the pair of engines are maintained constant. Moreover, it is possible to prevent slide between the engines and the main rotor from occurring, and hence the lift from being reduced, so that the flight can be safely continued.

Alternatively, a speed change apparatus may be disposed in the power transmission system for the tail rotor. The speed change apparatus is interposed between the bevel gear 71 and the tail rotor, the bevel gear 71 is coupled to the input shaft 11, and the output shaft 12 is coupled to the tail rotor. According to this configuration, the number of rotations of the tail rotor can be adjusted under the condition that the number of rotations of the pair of engines are maintained constant. Moreover, it is possible to prevent slide between the main rotor and the tail rotor from occurring. Therefore, the flight attitude can be stabilized, so that the flight can be safely continued.

Figure 6:
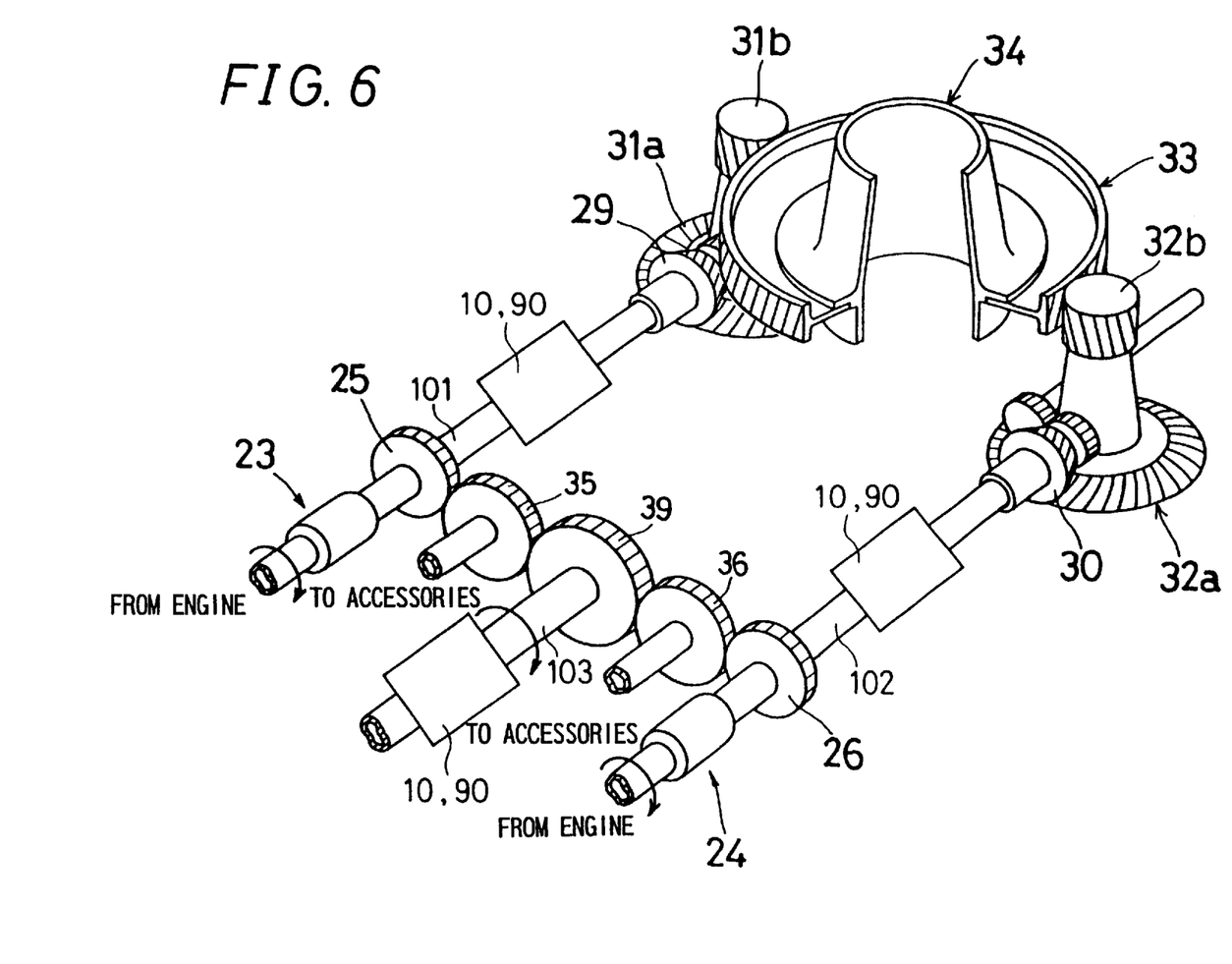
FIG. 6 is a view showing a second embodiment of a power transmission apparatus for helicopters into which a speed change mechanism is incorporated.

FIG. 6 is a view showing a second embodiment of a power transmission apparatus for helicopters into which a speed change mechanism is incorporated. Output shafts of a pair of engines are coupled to gears 25 and 26 via the freewheel clutches 23 and 24 which can transmit torque in one direction, respectively. The gears 25 and 26 function to branch the power to the main rotor and the tail rotor. Branch shafts 101 and 102 on the side of the main rotor are coupled to the bevel gears 29 and 30, respectively. The bevel gears mesh with the bevel gears 31*a* and 32*a* so as to change directions of respective rotation axes. The gear 31*b* which is rotated integrally with the bevel gear 31*a*, and the gear 32*b* which is rotated integrally with the bevel gear 32*a* mesh with the collector gear 33 to rotate the main rotor shaft 34.

The gears 25 and 26 mesh with gears 35 and 36, respectively, so as to branch the power to the side of the tail rotor via the gears 35 and 36. The gears 35 and 36 drive accessories 37 and 38 such as an oil pump, a hydraulic pump and a cooling fan, and mesh with a gear 39. The gear 39 is coupled to the tail rotor via a branch shaft 40 which is fixed.

In the configuration of FIG. 6, a speed change apparatus is interposed between the gear 25 and the bevel gear 29, the branch shaft 101 is coupled to the input shaft 11, and the output shaft 12 is coupled to the bevel gear 29. Similarly, another speed change apparatus is interposed between the gear 26 and the bevel gear 30. According to this configuration, the number of rotations of the main rotor coupled to the main rotor shaft 34 can be adjusted under the condition that the number of rotations of the pair of engines is maintained constant. Moreover, it is possible to prevent slide between the engines and the main rotor from occurring, and hence the lift from being reduced, so that the flight can be safely continued.

Alternatively, a speed change apparatus may be disposed in a power transmission system for the tail rotor. The speed change apparatus is interposed between the gear 39 and the tail rotor, the branch shaft 103 is coupled to the input shaft 11, and the output shaft 12 is coupled to the tail rotor. According to this configuration, the number of rotations of the tail rotor can be adjusted under the condition that the number of rotations of the pair of engines are maintained constant. Moreover, it is possible to prevent slide between the main rotor and the tail rotor from occurring. Therefore, the flight attitude can be stabilized, so that the flight can be safely continued.

Figure 7:
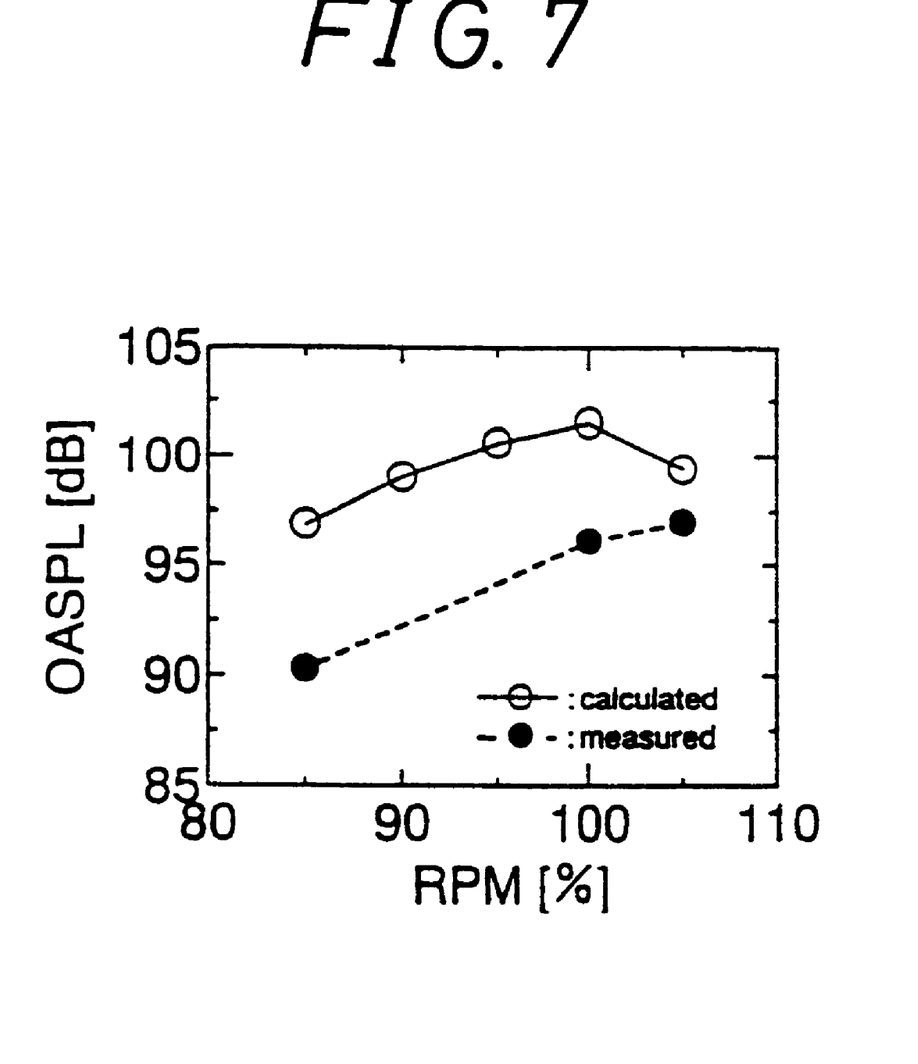
FIG. 7 is a graph showing noise level with respect to rotational speed of a main rotor.

FIG. 7 is a graph showing noise level with respect to the rotational speed of the main rotor. The abscissa of the graph indicates the rotational speed of the main rotor which is normalized by a usual rotational speed, and the ordinate indicates the noise level (dB). The graph shows theoretical values and experimental values of noise level. In both the cases, the noise level is lowered as the rotational speed is made lower from 100% RPM. In this way, the level of noise generated by the main rotor largely depends on the rotational speed of the main rotor. When the rotational speed of the main rotor can be continuously varied as in the invention, it is possible to reduce the noise level.

FIG. 8 is a view showing an example of modification in part of a the speed change apparatus 90 of FIG. 4. A speed change apparatus 99 is configured in the following manner. The clutch 91 of the speed change apparatus 90 is removed, and the gear 17 is coupled to the pressurizing apparatus 52 via the transmission shaft 22. The clutch 92 is removed, so that the gear 93 is separated from the gear 94. The other components are configured in the same manner as those of the speed change apparatus 90, and hence their description is omitted. In the same manner as the speed change apparatus 90, in the speed change apparatus 99, the sun gear 61 is fixed to the output disks 54 and 54*a*. Therefore, the structure can be simplified, and the apparatus can be miniaturized. In the speed change apparatus 99, however, the power is always branched to the traction transmission mechanism 27, and hence the speed change ratio is always variable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A power transmission apparatus for helicopters, comprising:

a traction transmission mechanism capable of generating a continuously varying speed change ratio;

a coupling switching mechanism for changing over a coupling state among an input shaft, an output shaft, and the traction transmission mechanism to carry out a switching of operation mode between a variable mode, wherein the speed change ratio is varied by branching power from the input shaft into power to be transmitted to the traction transmission mechanism and into power to be joined with power from the traction transmission mechanism to be transmitted to the output shaft, and a fixed mode, wherein the speed change ratio is fixed by directly transmitting the power from the input shaft to the output shaft;

a slide detecting device for detecting a slide in the traction transmission mechanism; and a switching controlling device for, when a slide is detected, switching the coupling switching mechanism from the variable mode to the fixed mode.

2. A power transmission apparatus for helicopters, comprising:

a traction transmission mechanism capable of generating a continuously varying speed change ratio;

a coupling switching mechanism for changing over a coupling state among an input shaft, an output shaft, and the traction transmission mechanism to carry out a switching of operation mode between a variable mode, wherein the speed change ratio is varied by branching power from the input shaft into power to be transmitted to the traction transmission mechanism and into power to be joined with power from the traction transmission mechanism to be transmitted to the output shaft, and a fixed mode, wherein the speed change ratio is fixed by directly transmitting the power from the input shaft to the output shaft;

a number of rotations detecting device for detecting the number of rotations of the engine; and a switching controlling device for, during a period when the detected number of rotations is smaller than a predetermined number of rotations, setting the coupling switching mechanism to the fixed mode, and for, when the detected number of rotations is not smaller than the predetermined number of rotations, switching the coupling switching mechanism to the variable mode.

3. A power transmission apparatus for helicopters, comprising:

a traction transmission mechanism capable of generating a continuously varying speed change ratio;

a coupling switching mechanism for changing over a coupling state among an input shaft, an output shaft, and the traction transmission mechanism to carry out a switching of operation mode between a variable mode, wherein the speed change ratio is varied by branching power from the input shaft into power to be transmitted to the traction transmission mechanism and into power to be joined with power from the traction transmission mechanism to be transmitted to the output shaft, and a fixed mode, wherein the speed change ratio is fixed by directly transmitting the power from the input shaft to the output shaft;

a number of rotations detecting device for detecting a number of rotations of the output shaft;

a speed change ratio controlling device for controlling the speed change ratio of the traction transmission mechanism to bring the number of rotations of the output shaft in the variable mode close to the number of rotations in the fixed mode; and a switching controlling device for, when the number of rotations in the variable mode reaches the number of rotations in the fixed mode, switching the coupling switching mechanism from the variable mode to the fixed mode.

* * * * *